US006859697B2

(12) United States Patent
Muragishi

(10) Patent No.: US 6,859,697 B2
(45) Date of Patent: Feb. 22, 2005

(54) INFORMATION DISPLAY APPARATUS FOR A VEHICLE

(75) Inventor: Hajime Muragishi, Kyoto (JP)

(73) Assignee: Nippon Yusoki Co., Ltd., Kyoto (JP)

( * ) Notice: Subject to any disclaimer, the term of this patent is extended or adjusted under 35 U.S.C. 154(b) by 0 days.

(21) Appl. No.: 10/245,304

(22) Filed: Sep. 18, 2002

(65) Prior Publication Data

US 2003/0149513 A1 Aug. 7, 2003

(30) Foreign Application Priority Data

Feb. 6, 2002 (JP) ..................................... P2002-030088

(51) Int. Cl.[7] ................................................ G06F 19/00

(52) U.S. Cl. ............................. 701/31; 701/36; 701/50; 187/222

(58) Field of Search ................................ 703/1, 35, 29, 703/31, 34, 50, 36; 187/222

(56) References Cited

U.S. PATENT DOCUMENTS 4,222,491 A * 9/1980 Geppert ...................... 212/278
5,491,631 A * 2/1996 Shirane et al. ................ 701/35
5,579,227 A * 11/1996 Simmons et al. ............. 701/29
6,192,301 B1 * 2/2001 Park ............................ 701/29
6,266,594 B1 * 7/2001 Ishikawa ..................... 701/50
6,570,385 B1 * 5/2003 Roberts et al. ............. 324/378
2003/0004616 A1 * 1/2003 Obradovich et al. ........... 701/1

FOREIGN PATENT DOCUMENTS

JP 2000-146768 5/2000

* cited by examiner

*Primary Examiner*—Thomas G. Black
*Assistant Examiner*—Ronnie Mancho
(74) *Attorney, Agent, or Firm*—Sughrue Mion, PLLC

(57) ABSTRACT

An information display apparatus for a vehicle including: a key switch for starting the vehicle; a setting operation portion for inputting and setting a plurality of start-up inspection items to be inspected as to operations of the vehicle before starting work; a display portion for displaying the start-up inspection items set by the setting operation portion; and a control portion which controls the display portion in response to turning on of the key switch thereby to display the startup inspection items on the display portion. The control portion controls the vehicle, on which a start-up inspection as to all the start-up inspection items are terminated, in a state of capable of performing work.

6 Claims, 5 Drawing Sheets

INFORMATION DISPLAY APPARATUS FOR A VEHICLE

BACKGROUND OF THE INVENTION

1. Field of the Invention

The present invention relates to an information display apparatus for a working vehicle which displays various kinds of information relating to the working vehicle such as a forklift truck.

2. Description of the Related Art

Some kinds of forklift trucks as working vehicles are each provided at a driver's seat with a display portion formed by a liquid crystal display (LCD) so that various kinds of necessary information is displayed for an operator. To be concrete, vehicle information relating to running and a loading and unloading work such as a vehicle speed, a load of a baggage, a remaining capacity of a driving battery etc. are mainly displayed.

An operator can grasp the current state of the vehicle from the display of the display portion. For example, the operator can visually obtain and recognize such information that the running speed is too high, the charging of the battery is required etc.

In the case of a forklift truck, generally, a so-called start-up inspection is performed before starting the work of the day in order to improve the safety. The start-up inspection means to check, before actually starting the work, predetermined inspection items such as inspection of various kinds of lamps such as brake lamps, head lamps and winker lamps (or direction indicator or blinker lamps) of the forklift truck, inspection relating to the operability of a handle, and inspection relating to the elevational operation, the tilting operation and the reaching operation of forks, thereby to check the presence of abnormality or failure of the forklift truck.

When the degree of the abnormality or failure is large as to some of the inspection items so that some troubles are expected to occur in the work, the maintenance is performed immediately as to such inspection items. In contrast, when the degree of the abnormality or failure is slight as to some of the inspection items so that possibility of causing any trouble in the work is expected to be quite small, the data of the abnormality or failure as to some of the inspection items are merely used as reference data for a periodic inspection to be performed later.

However, according to the conventional start-up inspection, an operator is required to prepare in advance an inspection manual and a check sheet describing inspection items and how to perform the inspection and further required to perform the inspection referring to the inspection manual etc., so that the operator is required to take out the inspection manual etc. from a safekeeping room etc. at every starting of the work. Thus, there arises a problem that such procedures are very troublesome and becomes a burden for an operator.

Further, since the operator is required to memorize or take notes of inspection items, which was found to be abnormal or failure at the time of the start-up inspection, the burden on the operator is increased.

Further, since the operator performs the inspection while seeing the inspection manual etc., the operator may not aware if he or she skips some of the inspection items.

SUMMARY OF THE INVENTION

Accordingly, an object of the invention is to provide an information display apparatus which can prevent omission of the inspection of inspection items and can perform start-up inspection for a vehicle surely and easily.

In order to attain the aforesaid object, there is provided an information display apparatus for a vehicle, including: a key switch for starting the vehicle; a setting operation portion for inputting and setting a plurality of start-up inspection items to be inspected as to operations of the vehicle before starting work; a display portion for displaying the start-up inspection items set by the setting operation portion; and a control portion which controls the display portion in response to turning on of the key switch thereby to display the start-up inspection items on the display portion, wherein the control portion controls the vehicle, on which a start-up inspection as to all the start-up inspection items are terminated, in a state of capable of performing work.

According to such a configuration, in response to the turning-on of the key switch, the predetermined start-up inspection items set in advance are displayed on the display portion, and so the operator performs the inspection sequentially as to each of the start-up inspection items based on the display. When the inspection of all of the start-up inspection items is terminated, the control portion controls the forklift truck so as to place the forklift truck in a state capable of performing actual work.

Thus, unlike the prior art, the occurrence of some omission of the inspection of the inspection items caused by skipping can be prevented, and further it is not necessary to take out the inspection manual etc. from a safekeeping room to perform the inspection procedure. Thus, the start-up inspection of the forklift truck can be performed quite simply and surely.

Further, the invention is characterized by further including a clock portion for clocking time, wherein the control portion controls the display portion to display the start-up inspection items thereon in response to first turning-on of the key switch after the clock portion clocks start time set in advance.

According to such a configuration, the start-up inspection items are displayed on the display portion when the key switch is turned on for the first time after the clock portion clocks the start time set in advance, so that the start-up inspection can be executed more surely.

Further, the invention is characterized by further including a storage portion which is controlled by the control portion to store the start-up inspection items having been admitted not to be normal as a result of the start-up inspection.

According to such a configuration, unlike the prior art, the operator is not required to memorize or take notes of the inspection item which was found to be abnormal or failure at the time of the start-up inspection. Thus, at the time of a periodical inspection etc. to be performed later, the operator can easily grasp the items having been admitted not to be normal at the time of start-up inspection based on the data stored in the storage portion, so that the maintenance of the vehicle can be performed quite easily.

Further, the invention is characterized in that the working vehicle is a forklift truck, and the start-up inspection items includes at least normal/abnormal of operations of various kinds of lamps of the forklift truck, normal/abnormal of operation of a handle and normal/abnormal of various kinds of operations of forks.

According to such a configuration, the start-up inspection of the forklift truck can be performed easily and surely.

Further, the invention is characterized in that the control portion locks a running system and a hydraulic system of the forklift truck during the start-up inspection, and cancels a locked state of the running system and the hydraulic system on a condition that inspection is terminated as to all the start-up inspection items thereby to place the forklift truck in the state capable of performing actual work.

According to such a configuration, since the locked state of the running system and the hydraulic system is canceled on a condition that inspection is terminated as to all the start-up inspection items, the procedure can be surely shifted to the actual work state after the completion of the start-up inspection.

Further, the invention is characterized in that the control portion locks a running system and a hydraulic system of the forklift truck during the start-up inspection, and cancels a locked state of the running system and the hydraulic system on a condition that all the start-up inspection items are admitted to be normal thereby to place the forklift truck in the state capable of performing actual work.

According to such a configuration, when at least one of the start-up inspection items is admitted not to be normal as a result of the start-up inspection, the locked state of the running system and the hydraulic system is maintained even after the termination of the inspection. Thus, the operator can be surely prevented from starting the work by using a forklift truck having an abnormal portion(s).

The lock of the running system and the hydraulic system of the forklift truck means that none of the running system and the hydraulic system are operated despite of the operation for operating the running system or the hydraulic system (for example, the operation of the pedal or the lever). For example, this lock corresponds to the inhibition of the rotation of a running motor used in the running system and a hydraulic motor used in the hydraulic system.

DETAILED DESCRIPTION OF THE PREFERRED EMBODIMENTS

Figure 1:
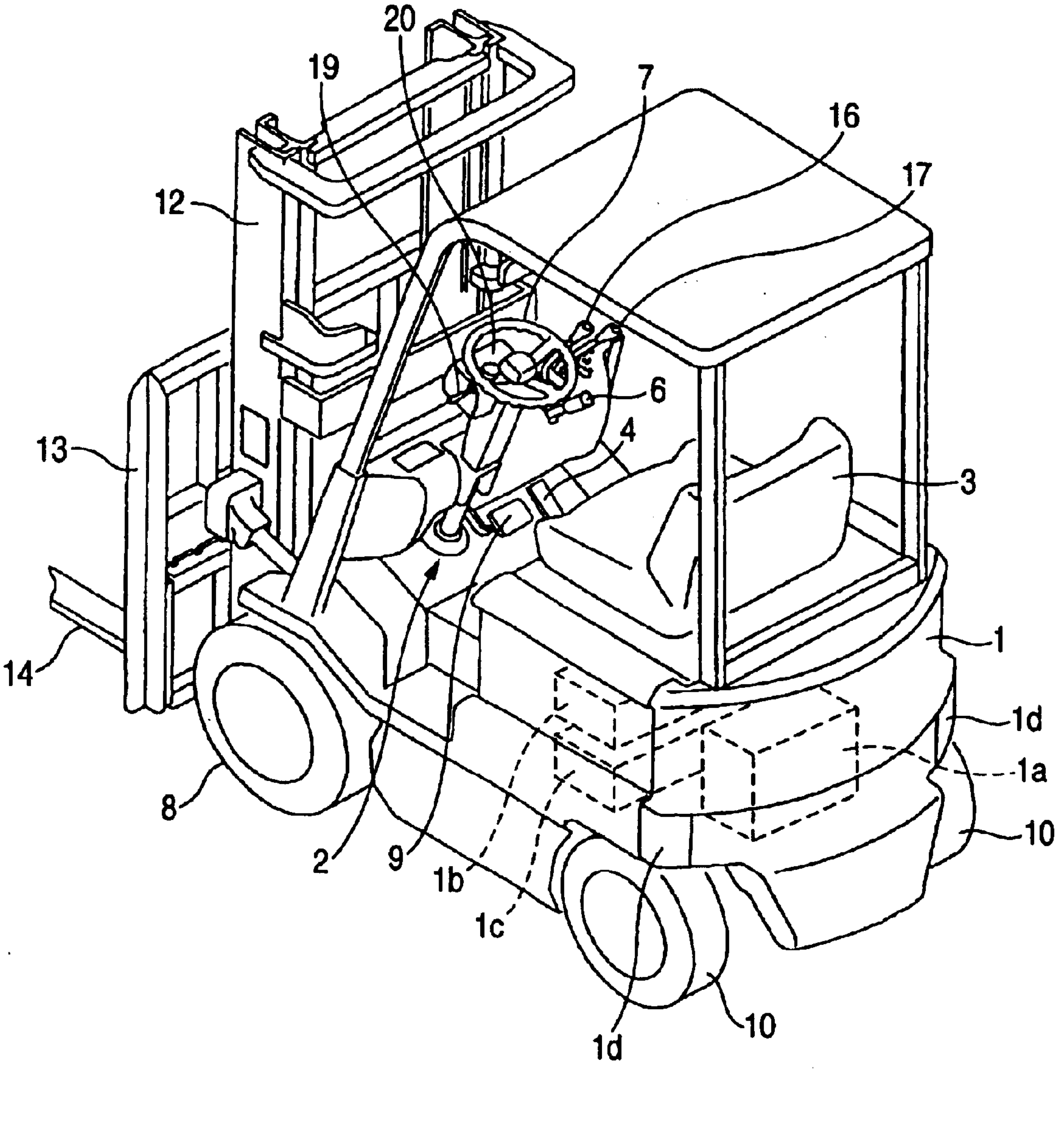
FIG. 1 is a perspective view of the counter balance type forklift truck according to an embodiment of the invention.

The explanation will be made with reference to FIGS. 1 to 9 as to an embodiment in which this invention is applied to a counter balance type forklift truck serving as a working vehicle. FIG. 1 is a perspective view of the counter balance type forklift truck, FIG. 2 is a perspective view showing a part thereof, FIG. 3 is a block diagram of a display control device, and FIGS. 4 to 9 are diagrams for explaining the operation of the embodiment.

Figure 2:
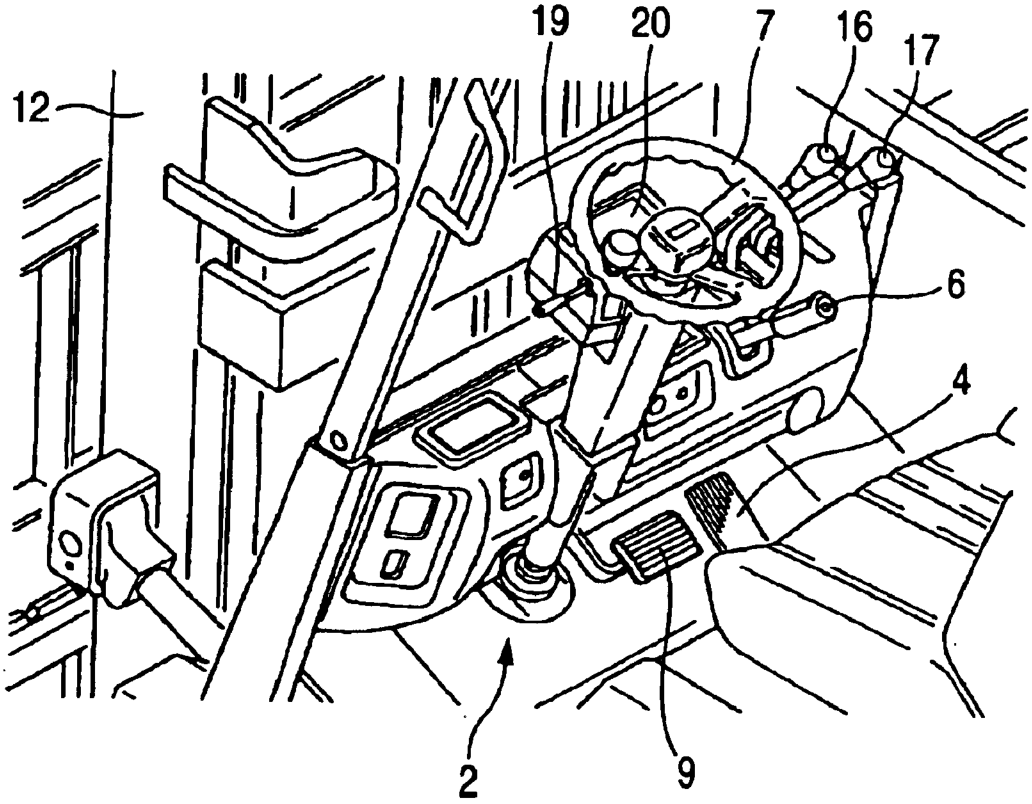
FIG. 2 is a perspective view showing a part of FIG. 1.
Figure 3:
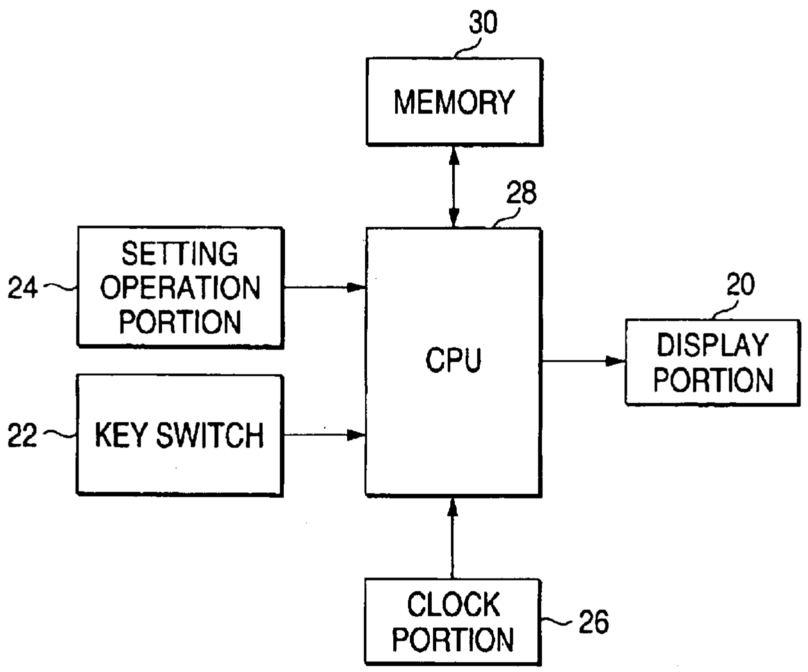
FIG. 3 is a block diagram showing a display control device according to the embodiment of the invention.

The counter balance type forklift truck according to the embodiment is configured as shown in FIGS. 1 and 2, for example. That is, a battery 1*a* is mounted and housed in the beneath of a seat 3 provided at a driver's seat 2 of a vehicle body 1. When a key switch (not shown) for starting the forklift truck is turned on, a running motor 1*b* constituting a running system and a hydraulic motor 1*c* constituting a hydraulic system are supplied with electric power from the battery.

Then, in response to the depression of an acceleration pedal 4, the running motor 1*b* is driven based on an output command value from a control device formed by a micro-computer etc, whereby the vehicle body 1 runs in the forward or backward direction set by the operation of a directional lever (not shown). In this case, the steering control of rear wheels 10 serving as steering wheels is performed by a steering handle 7, and a braking force is applied to front wheels 8 serving as driving wheels by depressing a brake pedal 9. In response to the depression of the brake pedal 9, brake lamps 1*d* disposed at the rear portion of the vehicle body 1 is lighted or turned on. A parking brake lever 6 is provided at the driver's seat 2. When a driver pulls the parking brake lever 6 on the driver's side at the time of parking, a braking force is applied to the front wheels 8 thereby to prevent the rotation of the front wheels 8.

Further, as shown in FIGS. 1 and 2, a mast 12 is attached to the front portion of the vehicle body 1 so as to be extensible. A pair of L-shaped forks 14 are attached to the mast 12 through a lift bracket 13. The hydraulic motor 1*c* is driven based on a control command value according to the operation of a lift lever 16 provided at the driver's seat 2, then a lift cylinder is operated to extend or shrink the mast 12, and then the forks 14 are lifted up and down due to the extension/shrinkage of the mast 12. The driver's seat 2 is provided with a tilt lever 17 in addition to the lift lever 16. When the tilt lever 17 is operated, a tilt cylinder is operated, then the mast 12 is tilted, and then the forks 14 are tilted together with the mast 12.

Further, as shown in FIGS. 1 and 2, in the vicinity of the steering handle 7 of the driver's seat 2, a winker lever 19 for lighting left and right winker lamps (not shown) forming direction indicators is disposed and also a head lamp switch for lighting head lamps (not shown) provided at the front portion of the vehicle body 1 is disposed.

Further, particularly as shown in FIG. 2, a display portion 20 formed by a liquid crystal display (LCD) is disposed so that vehicle information relating to running and a loading and unloading work such as a vehicle speed, a load of a baggage, a remaining capacity of a driving battery etc. is displayed, and further start-up inspection items such as normal/abnormal of the operations of various kinds of lamps such as the head lamps, the brake lamps, the winker lamps etc. of the forklift truck, normal/abnormal of the operation of the steering handle 7 and normal/abnormal of the various kinds of operations such as the up-down, tilting operations etc. of the forks 14 are displayed. The control relating to the display of the start-up inspection items is performed by a display control device described below.

That is, as shown in FIG. 3, the display control device includes, in addition to the display portion 20 and a key switch 22, a setting operation portion 24, a clock portion 26 for clocking time, a CPU 28 as a control portion, and a memory 30 formed by a RAM storing data necessary for display and a ROM storing control program etc.

The start-up inspection items constituted by a plurality of items relating to the operations of the forklift truck to be inspected and a start time are inputted and set in advance through the operation of the setting operation portion 24. After the start time thus set is clocked by the clock portion 26, when the CPU 28 detects the first turning-on of the key switch 22 after the lapse of the start time, the CPU 28 controls the display portion 20 to display the start-up inspection items set by the setting operation portion 24 on the display portion 20 and stores the inspection results in the memory 30. Such a display control processing preformed by the CPU 28 corresponds to a control portion of the invention.

A touch panel capable of performing input operation by directly touching thereto through fingers is disposed at the screen of the display portion 20. The predetermined displays of the touch panel and the display portion 20 constitute the aforesaid setting operation portion 24.

Figure 4:
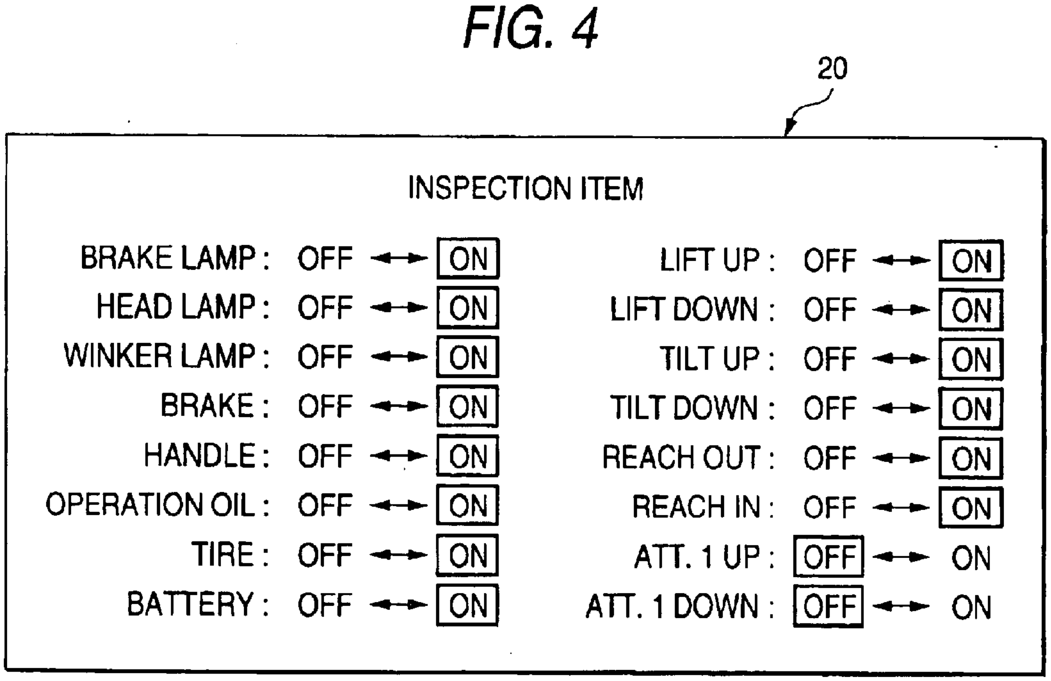
FIG. 4 is a diagram for explaining the operation of the embodiment of the invention.

The control of the display will be explained in detail with reference to a concrete example. First, as a prior processing in order to start the start-up inspection, as shown in FIG. 4, a list of the start-up inspection items common to all kinds of forklift trucks registered in the memory 30 in advance is displayed on the display portion 20 thereby to urge the operator to select necessary items for the counter balance type forklift truck. Further, as shown in FIG. 5, the setting screen for the start time is displayed on the display portion 20 thereby to urge the operator to input and set the start time, for example, "AM 8:30".

Further, as to the list of the start-up inspection items (see FIG. 4) displayed on the display portion 20, the operator selects one of "OFF" and "ON" being displayed simultaneously beside the each item. For example, when the operator touches the touch panel thereby to touch "ON", the corresponding item is selected. When the items are selected in this manner, the necessary start-up inspection items such as the normal/abnormal of the operations of the various kinds of lamps of the forklift truck, the normal/abnormal of the operation of the steering handle 7 and the normal/abnormal of the various kinds of operations of the forks 14 are determined by the CPU 28 and stored in the memory 30 as the start-up inspection items of the counter balance type forklift truck.

Figure 5:
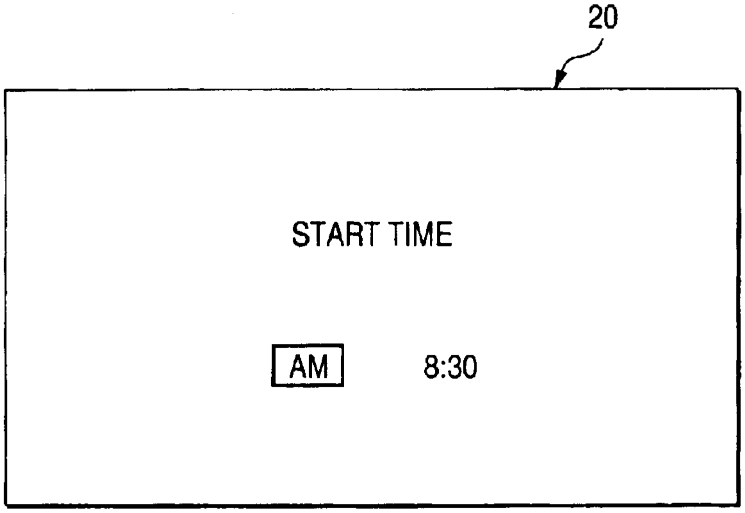
FIG. 5 is a diagram for explaining the operation of the embodiment of the invention.

In the setting screen for the start time shown in FIG. 5, when the start time is inputted and set, the CPU 28 stores and registers the start time data thus set in the memory 30. Then, when the clock portion 26 clocks the start time thus registered, the CPU 28 prepares to display the start-up inspection items and terminates the preprocessing.

Figure 6:
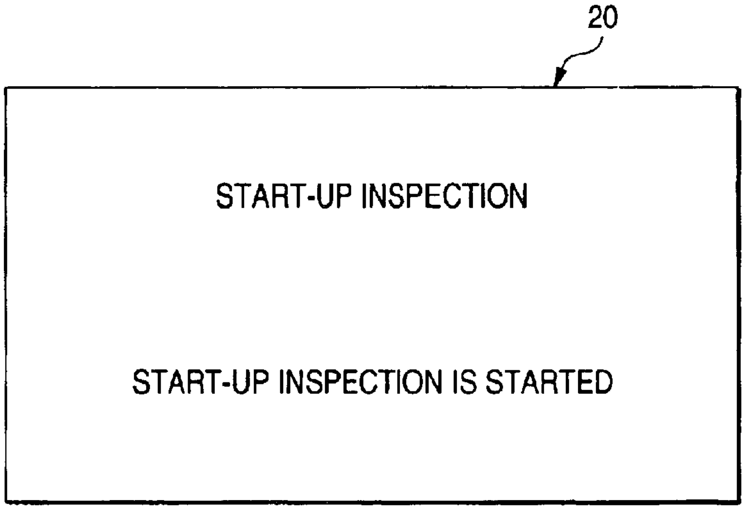
FIG. 6 is a diagram for explaining the operation of the embodiment of the invention.

On the condition that the key switch 22 is turned on for the first time after the start time (for example, AM 8:30) has been clocked, the CPU 28 controls the display portion 20 thereby at first to display the inspection start screen displaying that "start-up inspection is started" on the display portion 20 as shown in FIG. 6. Then, the selected start-up inspection items are sequentially displayed together with the brief procedure or guide of the inspection procedure.

Figure 7:
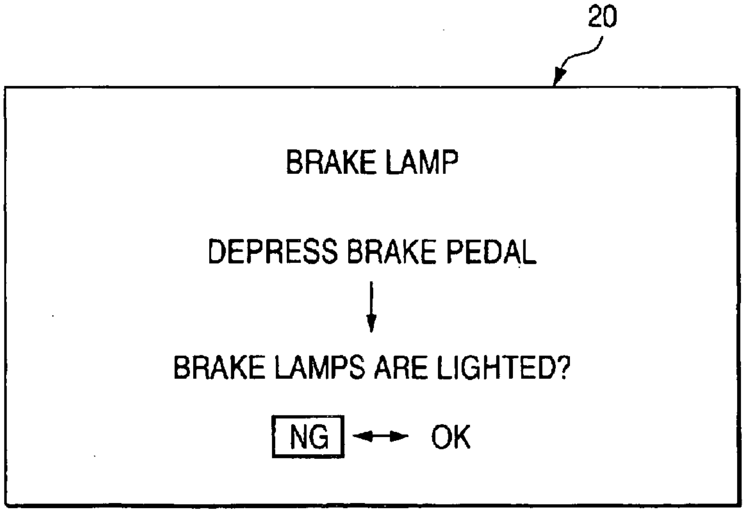
FIG. 7 is a diagram for explaining the operation of the embodiment of the invention.

For example, as shown in FIG. 7, as an inspection screen relating to the brake lamps which are the first inspection item, the procedures (or guides) of "depress brake pedal" and "brake lamps are lighted?" are displayed and also the display for selecting "NG" or "OK" as the inspection result is made on the display portion 20. According to the display, the operator checks the brake lamps and touches the touch panel thereby to select one of "NG" and "OK" (in this case, "NG" is selected). The selected inspection result is taken into the CPU 28 and stored in the memory 30 together with inspection date and hour data.

Figure 8:
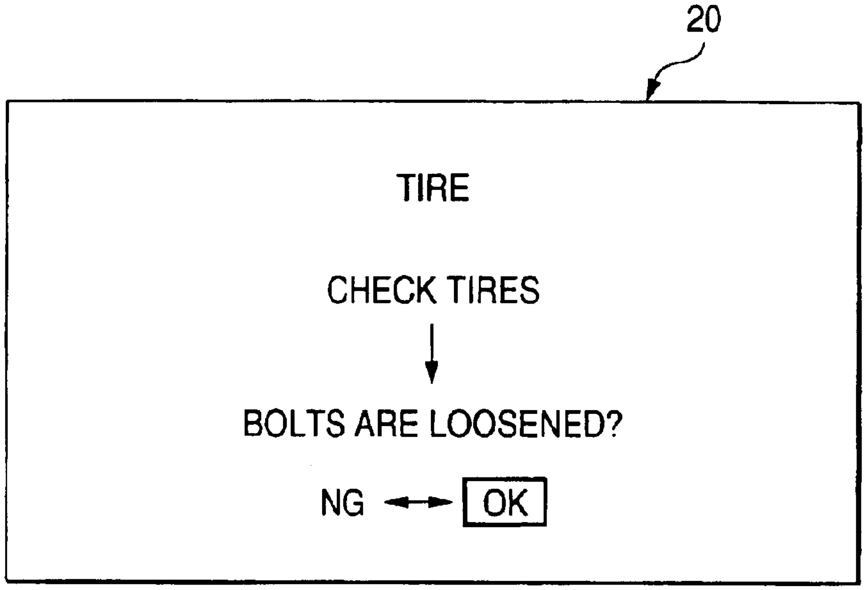
FIG. 8 is a diagram for explaining the operation of the embodiment of the invention.
Figure 9:
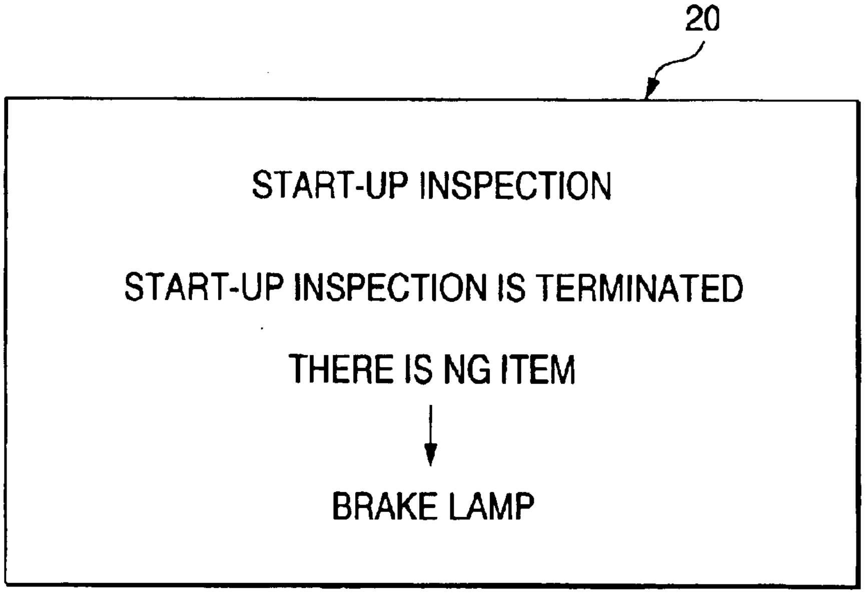
FIG. 9 is a diagram for explaining the operation of the embodiment of the invention.

When the first inspection relating to the brake lamps is completed, as shown in FIG. 8, as an inspection screen relating to the tires which are the second inspection item, the procedures (or guides) of "check tires" and "bolts are loosened ?" are displayed and also the display for selecting "NG" or "OK" as the inspection result is made on the display portion 20. According to the display, the operator checks the tires and touches the touch panel thereby to select one of "NG" and "OK" (in this case, "OK" is selected). The selected inspection result is taken into the CPU 28 and stored in the memory 30 together with inspection date and hour data.

When the inspection as to all the start-up inspection items selected in advance has been completed in this manner, an inspection termination screen indicating "start-up inspection is terminated" and "there is NG item(s)→ brake lamp" is displayed on the display portion 20.

During such a start-up inspection procedure, the CPU 28 controls both the running motor 1*b* and the hydraulic motor 1*c* in a locked state so as not to operate them. Then, when the inspection termination screen is displayed on the display portion 20 due to the termination of the start-up inspection, the CPU 28 cancels the locked state of each of the running motor 1*b* and the hydraulic motor 1*c*, so that the forklift truck is placed in a state capable of performing actual work. The locked state of the running motor 1*b* and the hydraulic motor 1*c* means that even if the acceleration pedal 4 is depressed or the lift lever 16 or the tilt lever 17 is operated, the rotation of each of the running motor 1*b* and the hydraulic motor 1*c* is inhibited despite of such an operation.

The memory 30 stores the inspection results as to the start-up inspection items of each day. The start-up inspection items which were stored as "NG" in the memory 30 are displayed on the display portion 20 in the periodical inspections performed at every predetermined period so as to be used for the maintenance of the forklift truck.

In this manner, in response to the turning-on of the key switch 22, the predetermined start-up inspection items set in advance are displayed on the display portion 20, and so the operator performs the inspection sequentially as to each of the start-up inspection items based on the display. When the inspection of all of the start-up inspection items is terminated, the CPU 28 controls the forklift truck so as to place the forklift truck in a state capable of performing actual work.

Thus, according to the aforesaid embodiment, unlike the prior art, the occurrence of some omission of the inspection of the inspection items caused by the skip of some of the inspection items can be prevented, and further it is not necessary to take out the inspection manual etc. from a safekeeping room to perform the inspection procedure. Thus, the start-up inspection of the forklift truck can be performed quite simply and surely.

Although, in the aforesaid embodiment, only the brake lams and the tires are shown as the display example of the start-up inspection items (see FIGS. 7 and 8), other items necessary for the counter balance type forklift truck may also be displayed in the same manner.

Further, in the aforesaid embodiment, although the explanation has been made as to the case where the start-up inspection items are displayed on the display portion 20 when the key switch 22 is turned on for the first time after the lapse of the start time, the start-up inspection items may be displayed on the display portion 20 when a command indicating the start is inputted into the CPU 28 by any means and the key switch 22 is turned on, for example.

Further, in the aforesaid embodiment, although the results of the start-up inspection are stored in the memory 30, the results of the start-up inspection may not necessarily be stored in the memory 30.

Further, in the aforesaid embodiment, when the inspection termination screen is displayed on the display portion 20 due to the termination of the start-up inspection, the CPU 28 cancels the locked state of each of the running motor 1*b* and the hydraulic motor 1*c*. However, when "NG" is selected as to at least one of the start-up inspection items, the CPU may continuously place both the running motor 1*b* and the hydraulic motor 1*c* in the locked state even after the termination of the start-up inspection.

When the invention is arranged in this manner, the locked state of each of the running motor 1*b* and the hydraulic motor 1*c* is cancelled only when all the start-up inspection items are admitted to be normal, that is, "OK" is selected as to each of all the start-up inspection items and the start-up inspection is terminated. Thus, the operator can be prevented from starting the work by using a forklift truck having an abnormal portion(s).

Further, in the aforesaid embodiment, although the explanation has been made as to the case where the invention is applied to a counter balance type forklift truck, the invention of course can be applied to other general working vehicles including cargo vehicles such as a reach type forklift truck, other types of forklift trucks and the effects similar to those of the aforesaid embodiment can also be obtained in this case.

The invention is not limited to the aforesaid embodiment and various modification can be made without departing from the gist of the invention.

As described above, according to the invention, in response to the turning-on of the key switch, the predetermined start-up inspection items set in advance are displayed on the display portion, and so the operator performs the inspection sequentially as to each of the start-up inspection items based on the display. When the inspection of all of the start-up inspection items is terminated, the control portion controls the forklift truck so as to place the forklift truck in a state capable of performing actual work. Thus, unlike the prior art, the occurrence of some omission of the inspection of the inspection items caused by the skip of some of the inspection items can be prevented. Further, it is not necessary to prepare the inspection manual etc. and the start-up inspection of the working vehicle can be performed simply and surely.

According to the invention, the start-up inspection items are displayed on the display portion when the key switch is turned on for the first time after the clock portion clocks the start time set in advance, so that the start-up inspection can be executed more surely.

According to the invention, unlike the prior art, the operator is not required to memorize or take notes of the inspection item which was found to be abnormal or failure at the time of the start-up inspection. Thus, at the time of a periodical inspection etc. to be performed later, the operator can easily grasp the items having been admitted not to be normal at the time of start-up inspection based on the data stored in the storage portion, so that the maintenance of the subject working vehicle can be performed quite easily.

According to the invention, the start-up inspection of the forklift truck can be performed easily and surely.

According to the invention, since the locked state of the running system and the hydraulic system is canceled on a condition that inspection is terminated as to all the start-up inspection items, the procedure can be surely shifted to the actual work state after the completion of the start-up inspection.

According to the invention, since the locked state of the running system and the hydraulic system is canceled on a condition that all the start-up inspection items are admitted to be normal as a result of the start-up inspection, so that the worker can be prevented from starting the work by using the forklift truck having an abnormal portion(s).

What is claimed is:

1. An information display apparatus for a vehicle, comprising:

a key switch for starting the vehicle;

a setting operation portion for inputting and setting a plurality of start-up inspection items to be inspected as to operations of the vehicle before starting work;

a display portion for displaying the start-up inspection items set by the setting operation portion; and a control portion which controls the display portion in response to turning on of the key switch thereby to display the start-up inspection items on the display portion before the start-up inspection is terminated, wherein, when the start-up inspection as to all the start-up inspection items is terminated, the control portion controls the vehicle to be able to perform work.

2. An information display apparatus for a vehicle, comprising:

a key switch for starting the vehicle;

a setting operation portion for inputting and setting a plurality of start-up inspection items to be inspected as to operations of the vehicle before starting work;

a display portion for displaying the start-up inspection items set by the setting operation portion;

a clock portion for clocking time;

a control portion which controls the display portion thereby to display the start-up inspection items on the display portion, and wherein the control portion controls the display portion to display the start-up inspection items thereon in response to first turning-on of the key switch after the clock portion clocks start time set in advance;

wherein, when the start-up inspection as to all the start-up inspection items is terminated, the control portion controls the vehicle to be able to perform work.

3. The information display apparatus for a vehicle according to claim 2, further comprising a storage portion controlled by the control portion for storing the start-up inspection items admitted not to be normal as a result of the start-up inspection.

4. The information display apparatus for a vehicle according to claim 2, wherein the vehicle is a forklift truck, and the start-up inspection items includes at least normal/abnormal of operations of various kinds of lamps of the forklift truck, normal/abnormal of operation of a handle and normal/abnormal of various kinds of operations of forks.

5. The information display apparatus for a vehicle according to claim 4, wherein the control portion locks a running system and a hydraulic system of the forklift truck during the start-up inspection, and wherein the control portion cancels a locked state of the running system and the hydraulic system of the forklift truck, on which a start-up inspection as to all the start-up inspection items are terminated, in a state of capable of performing work.

6. The information display apparatus for a vehicle according to claim 4, wherein the control portion locks a running system and a hydraulic system of the forklift truck during the start-up inspection, and wherein the control portion cancels a locked state of the running system and the hydraulic system on a condition that all the start-up inspection items are admitted to be normal thereby to place the forklift truck in a state capable of performing work.

* * * * *